US010195792B2

(12) United States Patent
McMillan (10) Patent No.: US 10,195,792 B2
(45) Date of Patent: Feb. 5, 2019

(54) SYSTEM AND METHOD OF FORMING A COMPONENT USING A MANDREL ASSEMBLY

(71) Applicant: THE BOEING COMPANY, Chicago, IL (US)

(72) Inventor: Daniel James McMillan, Edmonds, WA (US)

(73) Assignee: The Boeing Company, Chicago, IL (US)

(*) Notice: Subject to any disclaimer, the term of this patent is extended or adjusted under 35 U.S.C. 154(b) by 912 days.

(21) Appl. No.: 14/588,465

(22) Filed: Jan. 2, 2015

(65) Prior Publication Data

US 2016/0193782 A1 Jul. 7, 2016

(51) Int. Cl.
*B29C 65/00* (2006.01)
*B23K 20/00* (2006.01)
(Continued)

(52) U.S. Cl.
CPC .......... *B29C 66/49* (2013.01); *B29C 33/0011* (2013.01); *B29C 33/046* (2013.01);
(Continued)

(58) Field of Classification Search
CPC .......... B29C 66/00; B29C 66/08; B29C 66/10; B29C 66/11; B29C 66/11; B29C 66/112; B29C 66/112; B29C 66/1122; B29C 66/30; B29C 66/30; B29C 66/302; B29C 66/302; B29C 66/3024; B29C 66/40; B29C 66/43; B29C 66/80; B29C 66/83; B29C 66/832; B29C 66/832; B29C 66/8322; B29C 66/8322; B29C 66/83221; B29C 66/90; B29C 66/92; B29C 66/92; B29C 66/926; B29C 66/926; B29C 66/9261; B29C 66/929; B29C 66/9292; B29C 66/96; B29C 66/96; B29C 66/961; B29C 65/00;
(Continued)

(56) References Cited

U.S. PATENT DOCUMENTS 5,356,692 A 10/1994 Perez
6,458,309 B1 * 10/2002 Allen ................... B29C 70/446
156/197

(Continued)

FOREIGN PATENT DOCUMENTS

EP 2181823 5/2010

OTHER PUBLICATIONS

Extended European Search Report for EP 15195374.2-1703, dated May 27, 2016.

*Primary Examiner* — Seyed Masoud Malekzadeh
*Assistant Examiner* — Matthew Hoover
(74) *Attorney, Agent, or Firm* — Joseph M. Butscher; The Small Patent Law Group, LLC (57) ABSTRACT

A mandrel assembly is configured to receive one or more layers of composite material to form a component. The mandrel assembly may include a tower having an outer forming wall surrounding a central passage, and an upper ring removably secured to the tower. The upper ring is configured to be removed from the tower after the layer(s) of composite material are wrapped around the outer forming wall and at least a portion of the upper ring. The component is removed from the tower after the upper ring is removed from the tower.

21 Claims, 11 Drawing Sheets

(51) Int. Cl.
  *B29C 70/44* (2006.01)
  *B29C 33/00* (2006.01)
  *B29C 33/04* (2006.01)
  *B29C 33/48* (2006.01)
  *B29C 65/48* (2006.01)
  *B29L 31/00* (2006.01)
  *B29D 23/00* (2006.01)
  *B29L 9/00* (2006.01)
  *B29L 31/30* (2006.01)

(52) U.S. Cl.
  CPC .......... *B29C 33/485* (2013.01); *B29C 65/48* (2013.01); *B29C 65/4835* (2013.01); *B29C 70/446* (2013.01); *B29D 23/00* (2013.01); *B29L 2009/00* (2013.01); *B29L 2031/3076* (2013.01); *B29L 2031/7504* (2013.01)

(58) Field of Classification Search
  CPC ......... B29C 65/70; B29C 65/78; B29C 65/78; B29C 65/78; B29C 65/7802; B23K 20/00; B23K 20/10
  See application file for complete search history.

(56) References Cited

U.S. PATENT DOCUMENTS

| | | |
|---|---|---|
| 7,798,285 B2 | 9/2010 | Chiou |
| 2010/0109208 A1* | 5/2010 | Hubert .................. B29C 33/48 264/571 |
| 2013/0126265 A1 | 5/2013 | Sternberger |

* cited by examiner

SYSTEM AND METHOD OF FORMING A COMPONENT USING A MANDREL ASSEMBLY

BACKGROUND OF THE DISCLOSURE

Embodiments of the present disclosure generally relate to systems and methods for forming an acoustic inlet barrel of an engine assembly, such as that of a jet aircraft.

Jet aircraft typically include one or more engines that may generate high levels of noise. For example, a fan case within a housing secured to a wing of an aircraft typically generates noise. Often, engine housings include one or more sound dampening structures that are used to absorb at least a portion of the noise generated by components of an engine. For example, an acoustic inlet barrel may be positioned at or proximate to an inlet of the engine housing upstream from a fan case.

Known acoustic inlet barrels are formed of composite materials, such as carbon-reinforced plastics, that are sandwiched around an acoustic core, such as a porous foam material. Each acoustic inlet barrel is generally formed of multiple pieces. For example, each acoustic inlet barrel may be formed of two or three pieces that are secured together through fasteners, such as bolts. Bulky bolt flanges are formed on the pieces and used to connect the pieces together with the separate and distinct fasteners. However, the bolt flanges add mass to the acoustic inlet barrel. Moreover, the process of securing the pieces together is generally labor and time intensive. Further, because each acoustic inlet barrel is formed from separate and distinct pieces that are secured together through fasteners, the integrity of the formed acoustic inlet barrel may be compromised through joints, seams, and the like between the pieces. Further, the areas on and around the joints, seams, and the like may exhibit less than optimal acoustical characteristics.

Accordingly, a need exists for a system and method of efficiently forming an acoustic inlet barrel.

SUMMARY OF THE DISCLOSURE

Certain embodiments of the present disclosure provide a mandrel assembly configured to receive one or more layers of composite material to form a component, such as an acoustic inlet barrel. The mandrel assembly may include a tower having an outer forming wall surrounding a central passage, and an upper ring removably secured to the tower. The upper ring is configured to be removed from the tower after the layer(s) of composite material are wrapped around the outer forming wall and at least a portion of the upper ring. The component formed of the one or more layers of composite material is configured to be removed from the tower after the upper ring is removed from the tower. Removal of the upper ring from the tower prevents the formed component from jig-locking to the mandrel assembly.

The mandrel assembly may include one or more fairing members removably secured to the tower. The fairing member(s) may be spaced apart from the upper ring when the upper ring and the fairing member(s) are secured to the tower. Each fairing member may include at least one seal that sealingly engages a portion of the outer forming wall when the fairing member(s) are secured to the tower.

The upper ring may include at least one seal that sealingly engages a portion of the outer forming wall. The upper ring may include at least a portion that extends radially outward away from the outer forming wall. In at least one embodiment, the upper ring and the tower are shaped to form an hourglass cross-sectional shape in the component.

The mandrel assembly may also include an internal liner jacket secured to an internal portion of the outer forming wall around the central passage. A duct may be defined between the internal liner jacket and the outer forming wall. The duct is configured to receive curing gas, such as heated air, from a curing device.

The upper ring may include an upper end defining an upper opening and a lower end defining a lower opening. The upper and lower openings may be non-parallel with one another. That is, the planes in which the respective openings reside may not be parallel with one another. Additionally, or alternatively, one or both of the upper and lower openings may be non-planar.

The upper ring may include a thin portion that connects to a thick portion. In at least one embodiment, at least a portion of an interior surface of the upper ring includes a plurality of structural supports surrounding a plurality of thermal features, such as cavities, thereby defining a lattice pattern. The structural supports may be configured to directly contact at least a portion of the outer forming wall when the upper ring is connected to the tower. In at least one embodiment, the upper ring includes one or more extraction protuberances that are configured to be engaged by an extractor to remove the upper ring from the tower.

Certain embodiments of the present disclosure provide a system for forming a component through one or more wrapped layers of composite material. The system may include a mandrel assembly configured to receive the one or more wrapped layers of the composite material. The mandrel assembly may include a tower having an outer forming wall surrounding a central passage, and an upper ring removably secured to the tower. The upper ring is configured to be removed from the tower after the layer(s) of composite material are wrapped around the outer forming wall and at least a portion of the upper ring. The component formed of the one or more layers of composite material is configured to be removed from the tower after the upper ring is removed from the tower.

The system may also include a curing device that includes a pedestal that supports the mandrel assembly. The curing device is configured to cure the wrapped layer(s) of the composite material wrapped around the mandrel assembly to form the component. For example, airflow from the curing device may be directed into a channel formed, in part, by an internal or interior jacket of the mandrel assembly.

The system may also include an extractor configured to extract the upper ring from the tower after the curing device cures the wrapped layer(s). The extractor is further configured to extract the component from the mandrel assembly after the upper ring has been extracted from the tower.

Certain embodiments of the present disclosure provide a method for forming a component. The method may include removably securing an upper ring to an upper portion of a tower of a mandrel assembly, removably securing one or more fairing members to a lower portion of the tower of the mandrel assembly, wrapping one or more layers of composite material around an outer forming wall of the mandrel assembly and at least a portion of the upper ring, wrapping a portion of the one or more layers of composite material around the tower proximate to the fairing member(s) to form a lower flange, curing the layer(s) wrapped around the mandrel assembly to form the component, removing the fairing member(s) from the tower after the curing operation, removing the upper ring from the tower after the curing operation, and removing the component from the tower after the fairing member(s) and the upper ring have been removed from the tower.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide a mandrel assembly that is configured to precisely, quickly, and repeatedly form a component, such as an acoustic inlet barrel that is configured to be secured to and/or within an engine assembly of an aircraft. Certain embodiments of the present disclosure provide a mandrel assembly that is configured to precisely, quickly, and repeatedly lay-up a complex, asymmetric shaped (such as asymmetric hourglass shaped) component, such as a cylindrical sandwich member (for example, an acoustic inlet barrel formed of layers of composite materials that sandwich a sound-absorbing material therebetween).

The mandrel assembly may include a main structure, such as a tower, and an upper ring that is removably secured to the tower. The ring may exhibit a thermal mass. The ring may include an upper edge and a lower edge that are not parallel with one another. Further, openings defined by the upper and lower edges may be non-circular. For example, the upper and lower edges may each be angled with respect to a central longitudinal axis of the upper ring so that the openings are oval or elliptical in shape.

In order to form a component, such as an acoustic inlet barrel, layers, such as layers of composite material, may be laid up over the main structure and the upper ring. A vacuum bag may cover the entire upper ring and the component such that the main structure provides a solid surface that may be devoid of leaks. The vacuum bag may be used to provide vacuum integrity with respect to a surface of the component. For example, the vacuum bag may be positioned over the component and a vacuum may draw out air therein to provide the component with a solid outer surface. Vacuuming may be used to consolidate plies of material used to form the component prior to the component being positioned within a curing system, such as an autoclave.

The main structure and the upper ring may be formed of a material that resists expansion when subjected to heat, such as invar, which is a nickel-iron alloy that exhibits a low coefficient of thermal expansion. The main structure may also include or be secured to an interior jacket liner, such as formed of aluminum, which forms an air channel, such as a duct, between an interior surface of the main structure and an interior surface of the linear. The air channel is configured to direct gas flow from a curing device during a curing process and promote convective heat transfer.

Embodiments of the present disclosure provide a system and method of forming a component, such as an acoustic inlet barrel. The acoustic inlet barrel may be integrally formed as a single piece, instead of through multiple pieces that are secured together through fasteners. That is, the formed acoustic inlet barrel may be devoid of fasteners that would otherwise be used to secure pieces together to form an acoustic inlet barrel. The upper ring secured to the main structure is removable in order to prevent the acoustic inlet barrel from jig-locking to the mandrel assembly.

Embodiments of the present disclosure minimize, prevent, or otherwise reduce vacuum bag leaks through the mandrel assembly. Embodiments of the present disclosure provide a mandrel assembly that is configured to ensure even heat distribution therethrough and within an acoustic inlet barrel during a curing process. Embodiments of the present disclosure provide efficient systems and methods of forming an acoustic inlet barrel, thereby reducing manufacturing time, labor, and costs.

Figure 1:
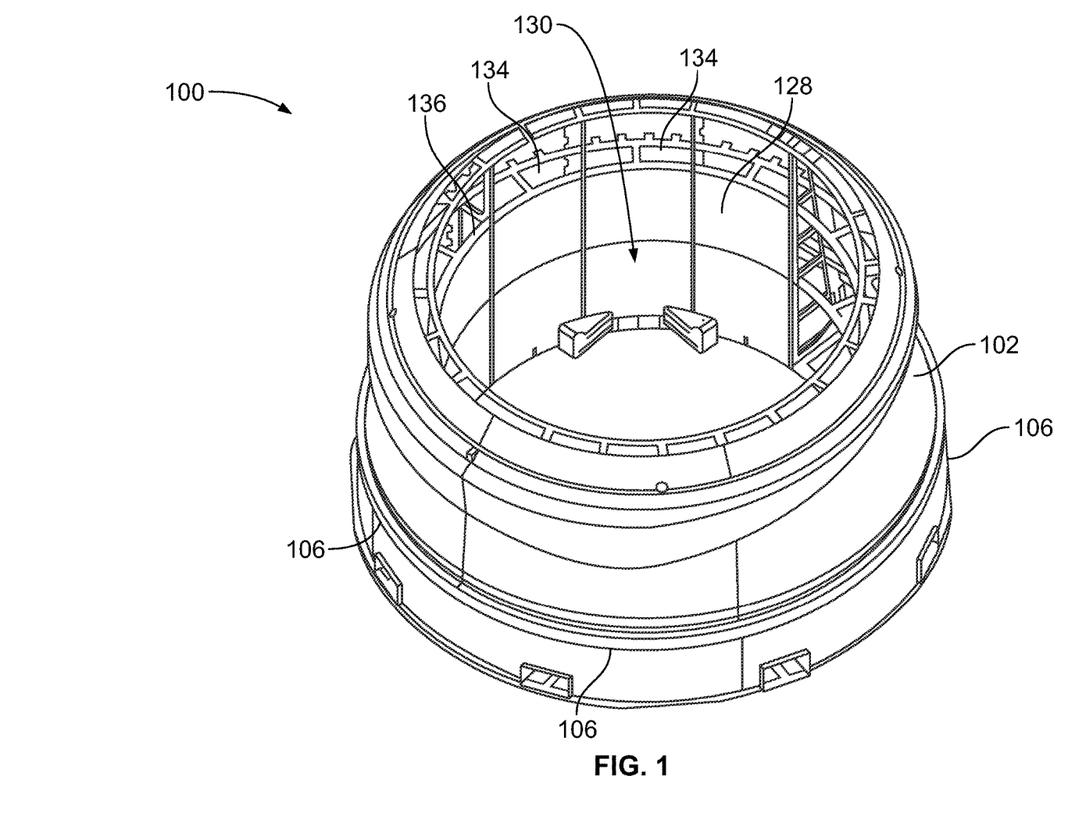
FIG. 1 illustrates a perspective top view of a mandrel assembly, according to an embodiment of the present disclosure.

FIG. 1 illustrates a perspective top view of a mandrel assembly 100, according to an embodiment of the present disclosure. The mandrel assembly 100 may include a main structure, such as a tower 102, an upper ring 104 (shown in FIG. 2) removably secured to the tower 102, and one or more lower fairing members 106, such as bars, rims, or the like, secured around a lower portion of the tower 102. Alternatively, the mandrel assembly 100 may not include the fairing members 106.

Figure 2:
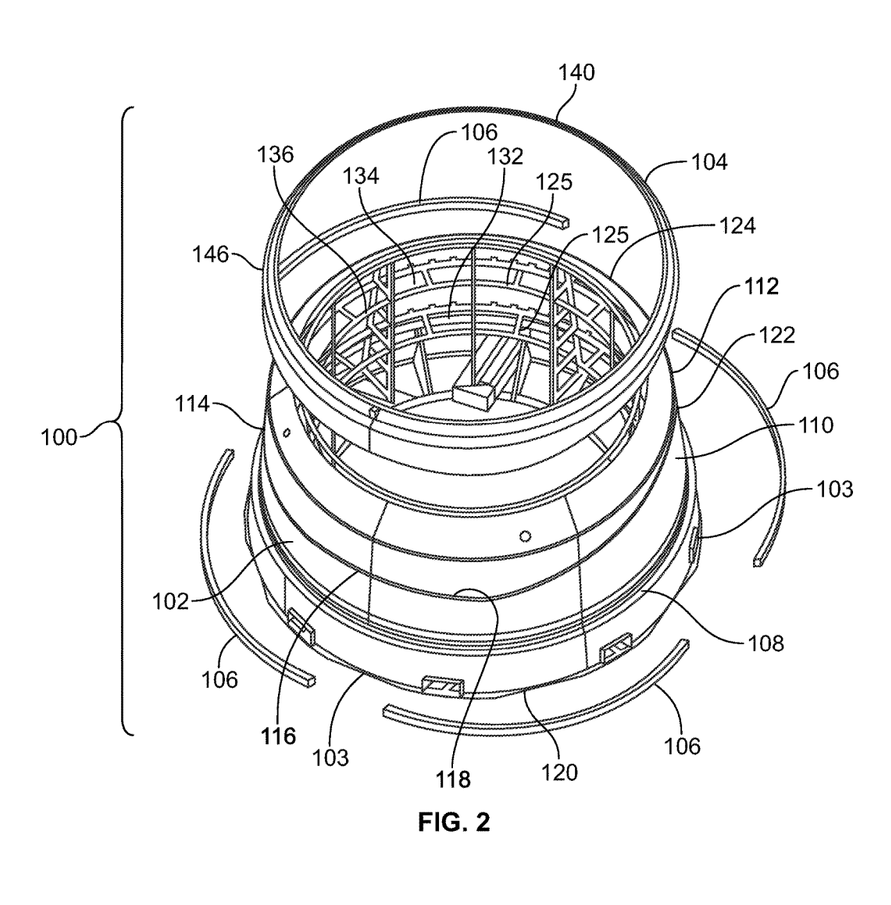
FIG. 2 illustrates a perspective top exploded view of a mandrel assembly, according to an embodiment of the present disclosure.

FIG. 2 illustrates a perspective top exploded view of the mandrel assembly 100. The tower 102 includes an annular base 103 having an upper ledge 108 that extends around the tower 102. An outer forming wall 110 extends upwardly from the upper ledge 108 and connects to a beveled upper rim 112.

The outer forming wall 110 includes an upper recess 114 formed therein. The upper recess may be defined by a lower ledge 116 that wraps around the outer forming wall 110. The lower ledge 116 may have a variable depth around the outer forming wall 110. For example, a depth 118 proximate to one side 120 of the tower 102 may be lower than a depth 122 proximate to an opposite side 124 of the tower 102.

The tower 102 includes multiple interior support structures 125, such as ribs, braces, beams, struts, trusses, and/or the like defining interior spaces therebetween. An interior liner jacket 128 (shown in FIG. 1), such as formed of aluminum, may be secured to interior surfaces of the support structures 125. The interior liner jacket 128 may circumferentially extend around an interior of the tower 102, thereby defining a central passage 130 (shown in FIG. 1) through the mandrel assembly 100. The interior liner jacket 128 forms a barrier past which air within the spaces 126 is unable to pass. As such, a duct 132 is defined between the interior liner jacket 128 and the outer forming wall 110. An opening may be formed at a bottom end of the base 108 to allow gas, such as air, to flow into the duct 132. Gas outlet channels 134 may be formed within a circumferential rim 136 that connects to an upper edge of the liner jacket 128.

During a curing process, the liner jacket 128 channels gas, such as forced air, into the duct 132, instead of into the central passage 130. In this manner, the duct 132 provides increased heat transfer in relation to the outer forming wall 110, such as through convection, as opposed to forced air that migrates into and flows in and through the central passage 130.

Each lower fairing member 106 is configured to be supported on the upper ledge 108 of the base 103. The lower fairing members 106 are configured to connect together, such as through snap-fit, latching, or other such connections, to form an annular member secured on the upper ledge 108. For example, one end of each fairing member 106 may include a plug portion that removably connects to a reciprocal receptacle end of a neighboring fairing member 106. While four fairing members 106 are shown, more or less fairing members may be used. For example, two or three fairing members 104 may form an annular member supported on the upper edge 108 of the base 103. Alternatively, a single, unitary fairing member in the form of a single formed ring may extend around the tower 102.

During a forming operation, the fairing members 106 provide a lower structural barrier that is configured to form an outwardly extending flange in a composite material as it is wrapped around the outer forming wall 110. As or after the final layer of composite material is wrapped around the outer forming wall 110, the fairing members 106 may be removed from the tower 102, and the final layer of material may be tucked up underneath the initial layer of material that abuts directly against the outer forming wall 110. Optionally, the fairing members 106 may be removed after the mandrel assembly and the composite materials wrapped around the mandrel assembly are subjected to a curing process.

Figure 4:
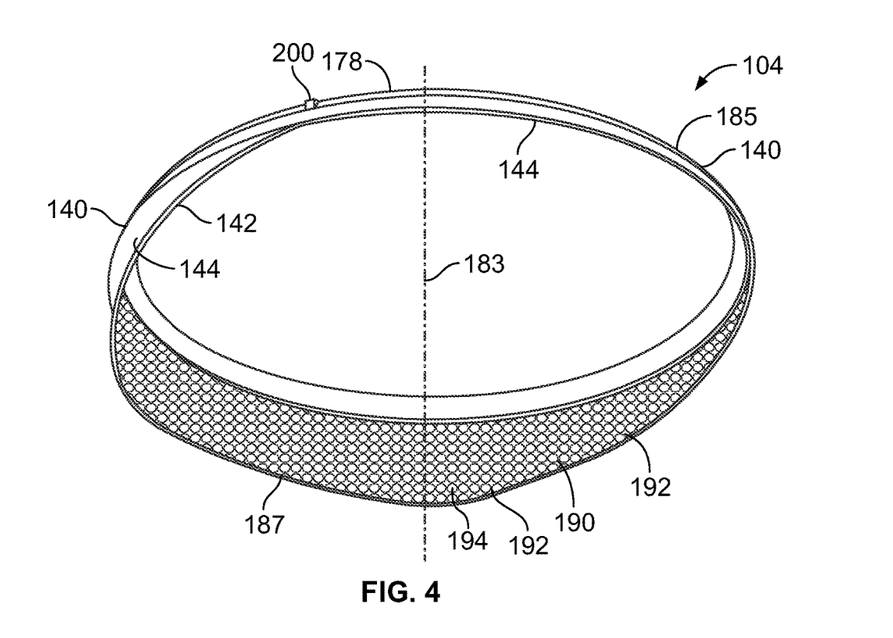
FIG. 4 illustrates a perspective bottom view of an upper ring, according to an embodiment of the present disclosure.

The upper ring 104 may be a unitary piece having an upper rim 140 secured to a lower edge 142 through a wall 144 (shown in FIG. 4). The depth of the wall 144 may vary around a circumference of the upper ring 104. The upper rim 140 may include an outer circumferential protuberance 146 that extends outwardly from the wall 144. The upper ring 104 is configured to be positioned within the upper recess 114 that extends around the outer forming wall 110. For example, the lower ledge 116 has a shape that conforms to the shape of the lower edge 142 (shown in FIG. 4). The lower ledge 116 supports the upper ring 104 on the tower 102.

During operation, as the layers of material are wrapped around the mandrel assembly 100 (or after such wrapping), an adhesive, such as a resin, may flow around and over the layers of material. The layer of composite material wrapped around mandrel assembly 100 is then cured, such as through a curing device (for example, an autoclave). After the curing process, the mandrel assembly 100 may be removed from the curing device, and the upper ring 104 may be removed from the tower 102. By removing the upper ring 104, the component formed through the multiple layers of composite material, does not jig-lock to the mandrel assembly, and may then be quickly and easily removed from the mandrel assembly 100.

Figure 3:
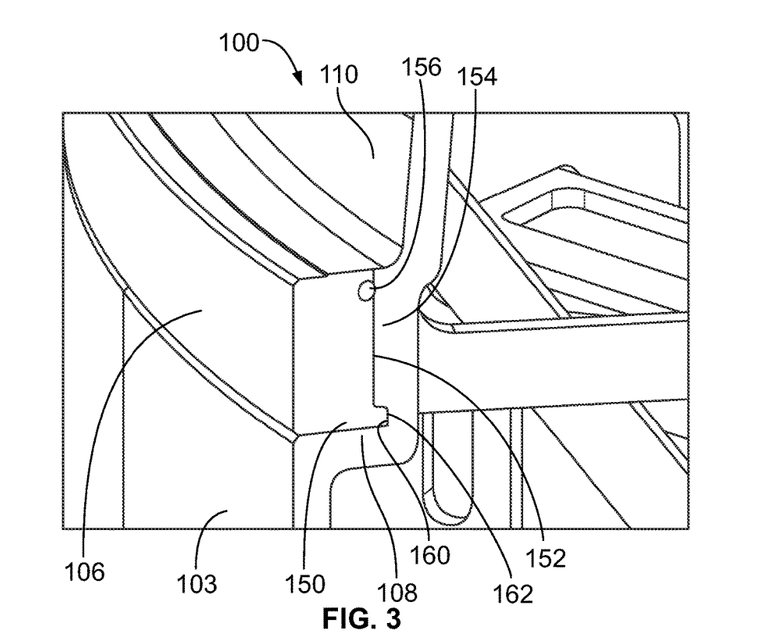
FIG. 3 illustrates a perspective cross-sectional view of a fairing member secured around a portion of a mandrel assembly, according to an embodiment of the present disclosure.

FIG. 3 illustrates a perspective cross-sectional view of a fairing member 106 secured around a portion of the mandrel assembly 100, according to an embodiment of the present disclosure. As shown, the fairing member 106 includes a lower surface 150 that abuts into and is supported by the upper ledge 108 of the base 103. The fairing member 106 also includes an interior surface 152 that abuts into an exterior surface 154 of a lower end of the outer forming wall 110. Additionally, the fairing member 106 may also include a seal 156, such as an arcuate bulb seal formed of silicone, which sealingly engages the exterior surface 154. As shown, the seal 156 may be retained within a circumferential channel and may extend from the interior surface 152 proximate to and/or at an upper end of the fairing member 106. The seal 156 prevents adhesive, such as resin, from infiltrating between the fairing member 106 and the outer forming wall 110. As such, the seal 156 prevents the fairing member 106 from sticking to the outer forming wall 110 through the adhesive.

An inner rim 160 may inwardly extend from the fairing member 106 and be retained within a reciprocal slot channel 162 formed through the outer forming wall 110, thereby securing the fairing member 106 to the outer forming wall 110. Alternatively, the fairing member 106 may not include the inner rim 160, and the outer forming wall 110 may be devoid of the reciprocal slot channel 162.

As shown, the fairing member 106 extends outwardly from the outer forming wall 110, such as at a right angle. Accordingly, as layers of material are wrapped around the outer forming wall 110, the fairing member 106 forms an outwardly-extending flange or rim in the forming layers. After the layers of material are formed around the outer forming wall, the fairing member 106 may be removed. In at least one embodiment, each fairing member 106 removably secures to a neighboring fairing member 106, as described above. Optionally, each fairing member 106 may be removably secured to the outer forming wall 110, such as through one or more fasteners.

Figure 5:
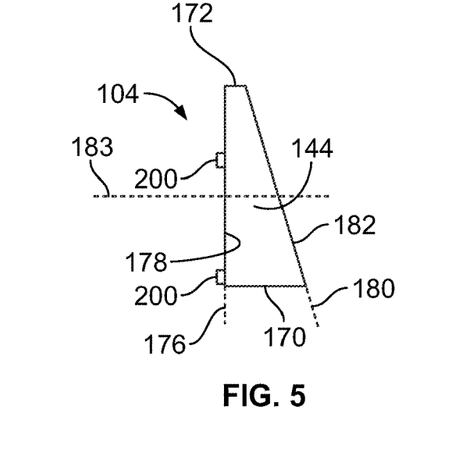
FIG. 5 illustrates a lateral view of an upper ring, according to an embodiment of the present disclosure.

FIG. 4 illustrates a perspective bottom view of an upper ring 104, according to an embodiment of the present disclosure. FIG. 5 illustrates a lateral view of the upper ring 104, according to an embodiment of the present disclosure. Referring to FIGS. 4 and 5, the wall 144 may be taller or deeper at one side 170 than at an opposite side 172, in order to form a component, such as an acoustic inlet barrel, having a first end that is sized and shaped accordingly. For example, an acoustic inlet barrel may have one side or end having an hourglass cross-section of a first arcuate shape, and an opposite end having an hourglass cross-section of a second arcuate shape that differs from the first arcuate shape. Accordingly, the acoustic inlet barrel may be asymmetric in relation to a central longitudinal axis.

As shown, a plane 176 in which an upper end 178 resides may be non-parallel with respect to a plane 180 in which a lower end 182 resides. Accordingly, openings defined by the upper and lower edges or ends 178 and 182, respectively, may be non-circular when they are angled with respect to a central longitudinal axis 183 of the upper ring 104 so that the openings are oval or elliptical in shape. Alternatively, one or both of the ends 178 and 182 may be aligned with the longitudinal axis 183 and not angled thereto (for example, the upper ring 104 may form a cylindrical sleeve having upper and lower openings formed through the ends that are parallel to one another). Additionally, or alternatively, the ends 178 and 182 may define non-planar openings (such as bent or curved openings that do not reside in a single plane).

The upper ring 104 may form a serpentine shape having a thin portion 185 that connects to a thick portion 187. The shape is serpentine in that it resembles the body of a serpent, in which the head and tail are thinner than a mid-section. The thickness of the upper ring 104 may uniformly or non-uniformly expand between the thin portion 185 and the thick portion 187.

As shown in FIG. 4, an interior surface 190 of the wall 144 may include a lattice or mesh pattern, such as a honeycomb structure, having multiple structural supports 192, such as walls, ribs, or the like, that cooperate to define multiple thermal features, such as cavities 194, chambers, inserts, or the like. When the upper ring 104 is secured to the tower 102 (shown in FIGS. 1 and 2), the structural supports 192 may directly connect the outer forming wall 110 (shown in FIGS. 1 and 2) to the wall 144, while the cavities 194 provide thermal features, such as recessed areas, that may be devoid of structure that would otherwise contact the outer forming wall 110. In this manner, the weight and thermal mass of the upper ring 104 is reduced, but conductive heat transfer occurs through the structural supports 192. As such, the mass and weight of the upper ring 104 is reduced, while heat transfer properties of the upper ring 104 are maintained. Alternatively, the structural supports 192 may not directly contact the outer forming wall 110

The lattice or mesh pattern may be formed as various other shapes and sizes other than a honeycomb pattern. For example, the structural supports 192 may form square, rectangular, triangular, circular, or the like cavities 194.

The upper ring 104 may also include one or more extraction protuberances 200, such as loops, eyelets, hoops, studs, barbs, clasps, latches, or the like, extending outwardly from the upper end 178. The extraction protuberances 200 are configured to receive terminal ends of extracting prongs of an extractor that are configured to be used to remove the upper ring 104 from the tower 102, as described below.

Figure 6:
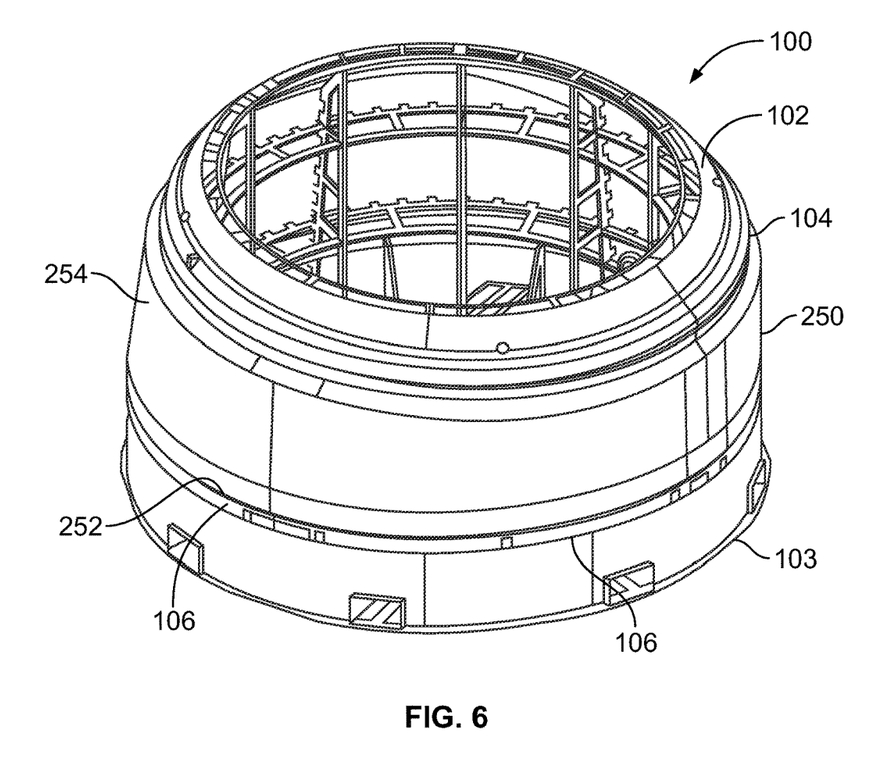
FIG. 6 illustrates a perspective view of a component wrapped around a mandrel assembly, according to an embodiment of the present disclosure.

FIG. 6 illustrates a perspective view of a component 250, such as an acoustic inlet barrel, wrapped around the mandrel assembly 100, according to an embodiment of the present disclosure. The fairing members 106 provide a lower barrier that forms a lower flange 252 of the component 250, while the upper ring 104 provides an outwardly bowed upper end 254 of the component 250.

Figure 7:
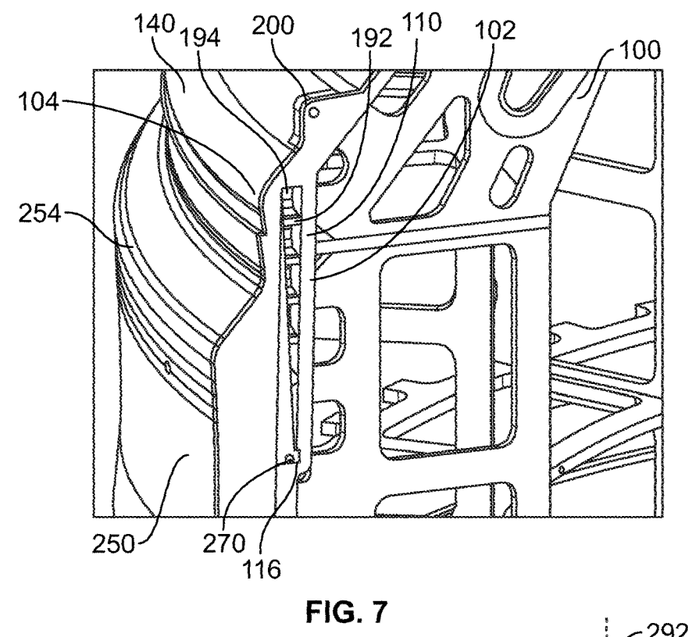
FIG. 7 illustrates a perspective cross-sectional view of a component abutting into an upper ring secured to an outer forming wall of a mandrel assembly, according to an embodiment of the present disclosure.

FIG. 7 illustrates a perspective cross-sectional view of the component 250 abutting into the upper ring 104 secured to an outer forming wall 110 of a mandrel assembly 100, according to an embodiment of the present disclosure. The structural supports 194 of the upper ring 104 contact the outer forming wall 110 of the tower 102. Heat may be transferred from the outer forming wall 110 to the outer surface of the upper ring 104 through the structural supports 194, so that heat may be transferred to the component 250 in order to cure the layers together with the adhesive, such as resin. The upper rim 140 protrudes radially outwardly from the mandrel assembly 100, in order to bow the upper end 254 of the component outwardly. The upper end 254 may connect to a tapered portion that extends towards the lower flange 252 (not shown). A seal 270, such an annular silicone ring, may sealingly engage the lower ledge 116 so that the adhesive does not flow from the component 250 between the upper ring 104 and the tower 102 as the layers of material that form the component are wrapped around the mandrel assembly 100 or during the curing process.

Figure 8:
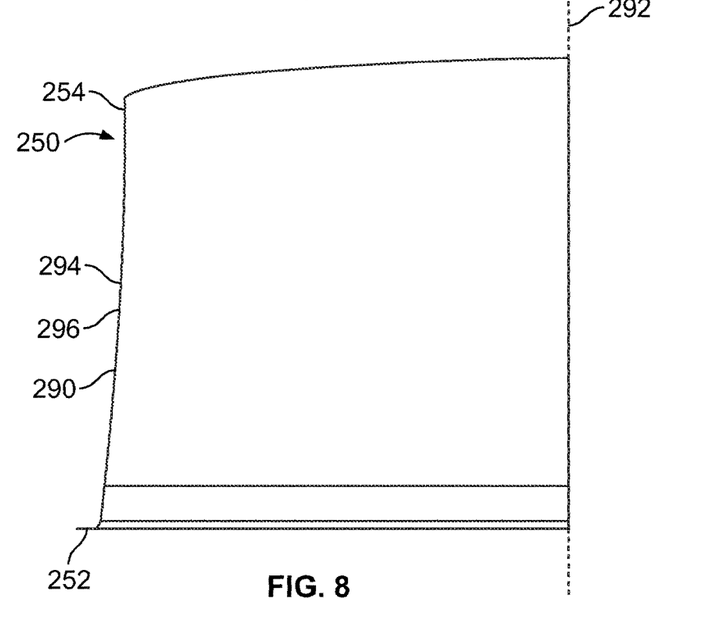
FIG. 8 illustrates an axial cross-sectional view of a wall of a component, according to an embodiment of the present disclosure.

FIG. 8 illustrates an axial cross-sectional view of a wall 290 of the component 250, according to an embodiment of the present disclosure. Referring to FIGS. 7 and 8, the upper end 254 bows outwardly away from a central axis 292 of the component 250. The upper ring 104 (as shown in FIG. 7) provides the outer bow in the upper end 254. The upper end 254 tapers to an inwardly-curved section 294 that is formed by abutting against the main portion of the outer forming wall 110 that has a diameter that is less than that of the upper rim 140. The section 294 may bow outwardly from a central portion 296 towards the lower flange 252, which is formed by the fairing members 106 (shown in FIGS. 1 and 2). Accordingly, the wall 290 may be formed in an hourglass shape with portions having different degrees of curvature based on the shape of the upper ring 104 (accordingly, the component 250 may be asymmetric in relation to the central axis 292). Alternatively, the upper ring 104 may be uniformly shaped so as to provide the component 250 with a uniform hourglass cross-sectional shape throughout (so that the component 250 is symmetric in relation to the central axis 292).

Figure 9:
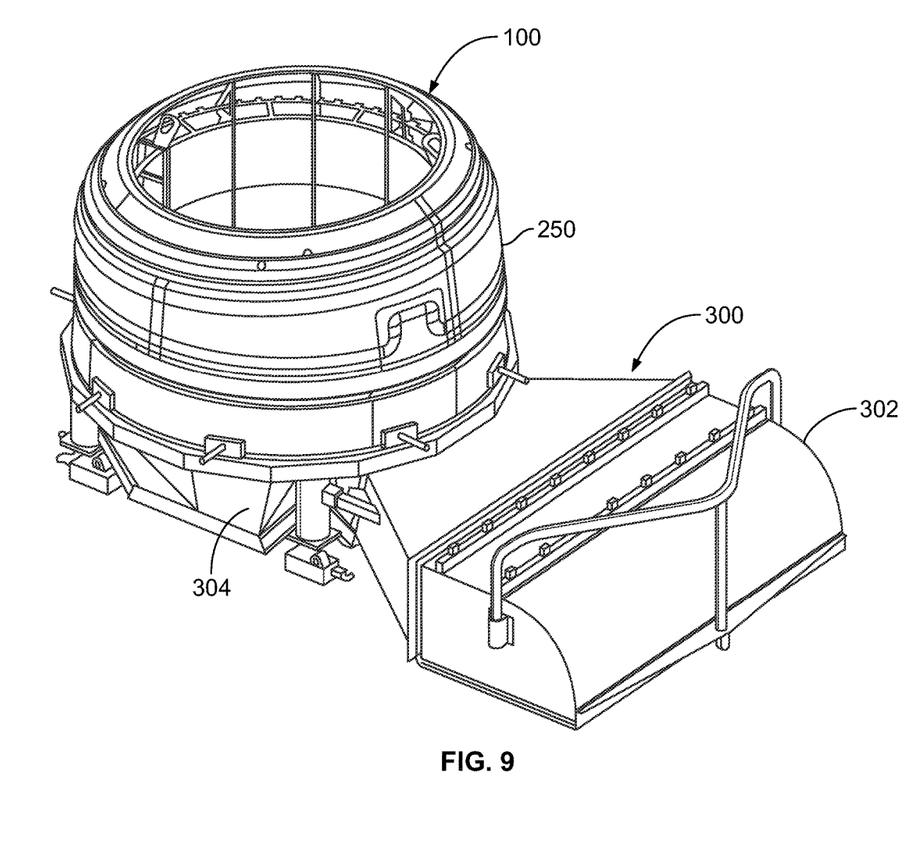
FIG. 9 illustrates a perspective top view of a component wrapped around a mandrel assembly that is supported on a curing device, according to an embodiment of the present disclosure.

FIG. 9 illustrates a perspective top view of the component 250 wrapped around the mandrel assembly 100, which is supported on a curing device 300, according to an embodiment of the present disclosure. After the component 250 is fully wrapped around the mandrel assembly 100, the curing device 300 is operated to cure the component 250 so that the adhesive, such as resin, securely connects the composite layers of the component 250 together. The curing device 300 may include a housing 302 that contains a heater and a blower. The housing 302 is connected to a pedestal 304 that supports the mandrel assembly 100.

Figure 10:
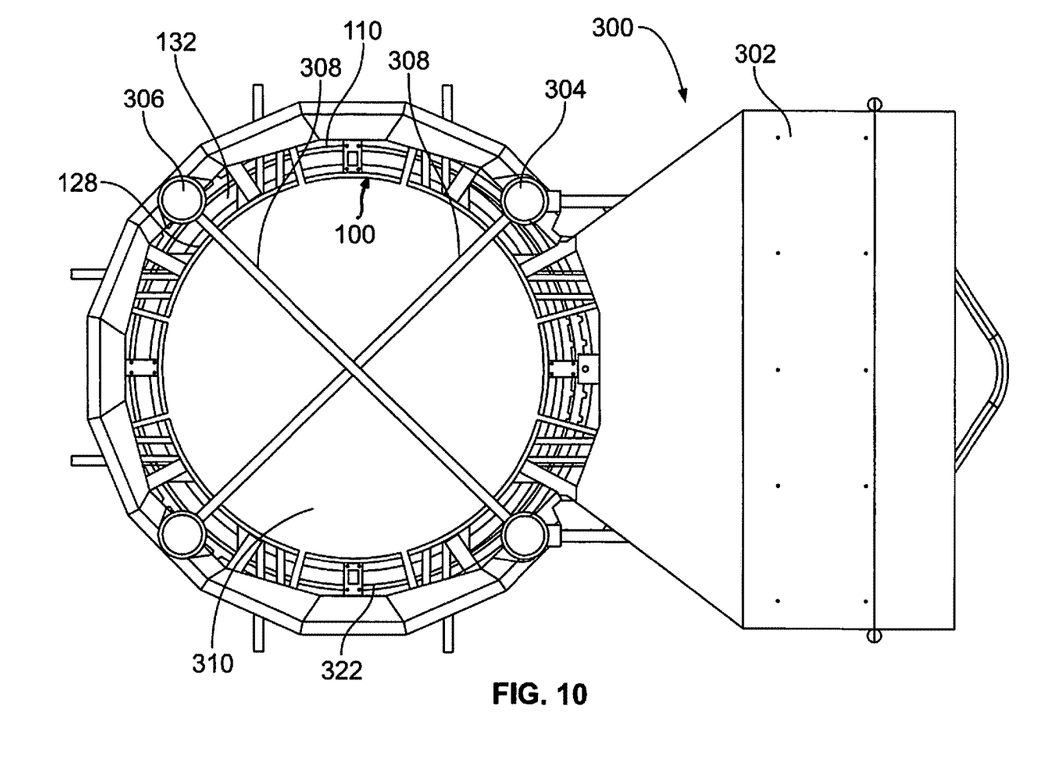
FIG. 10 illustrates a bottom view of a mandrel assembly supported on a curing device, according to an embodiment of the present disclosure.

FIG. 10 illustrates a bottom view of the mandrel assembly 100 supported on the curing device 300, according to an embodiment of the present disclosure. The pedestal 304 may include support legs 306 that connect together through crossbeams 308, for example. A barrier panel 310 is supported on the beams 308 and covers the central passage 130 (shown in FIG. 1, for example) of the mandrel assembly 100. For the sake of clarity, a bottom wall of the curing device 300 underneath the barrier panel 310 is hidden from view in order to show internal components of the curing device 300. Alternatively, various other curing devices may be used to cooperate with the mandrel assembly 100 cure a component, such as an acoustic inlet barrel. For example, the mandrel assembly 100 may be placed within an internal chamber of a curing oven.

Figure 11:
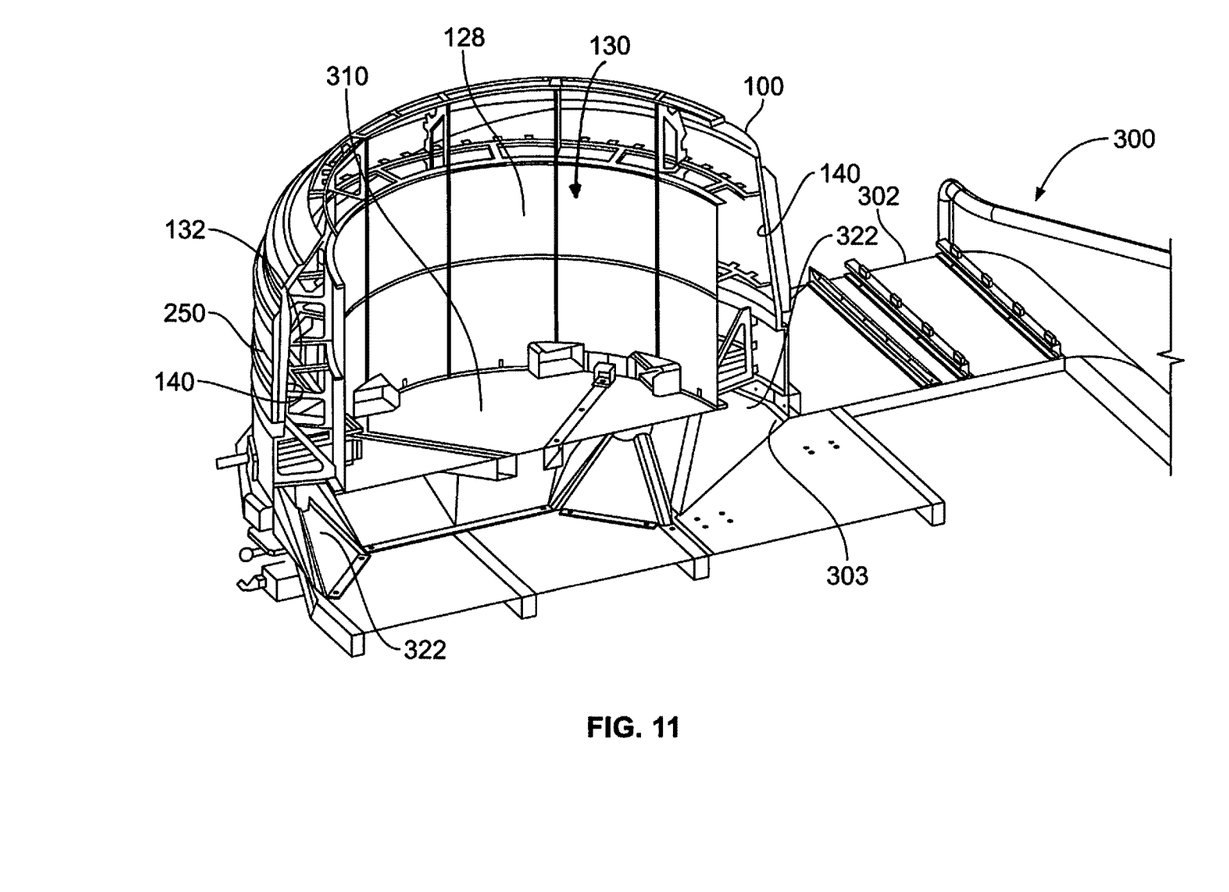
FIG. 11 illustrates a perspective cross-sectional view of a mandrel assembly supported on a curing device, according to an embodiment of the present disclosure.

FIG. 11 illustrates a perspective cross-sectional view of the mandrel assembly 100 supported on the curing device 300. Referring to FIGS. 10 and 11, the housing 302 includes a gas outlet 303 that that is in fluid communication with a channel 322 formed around the barrier panel 310 and which is in communication with the duct 132 defined between the interior liner jacket 128 and the outer forming wall 110. Accordingly, heated gas from the curing device 300 is channeled directly to the duct 132 and blocked from entering the central passage 130 by the barrier panel 310. As such, the heated gas is efficiently directed to and concentrated onto the interior surface of the outer forming wall 110 around which the component 250 is wrapped (see FIG. 9), thereby providing efficient curing.

Figure 12:
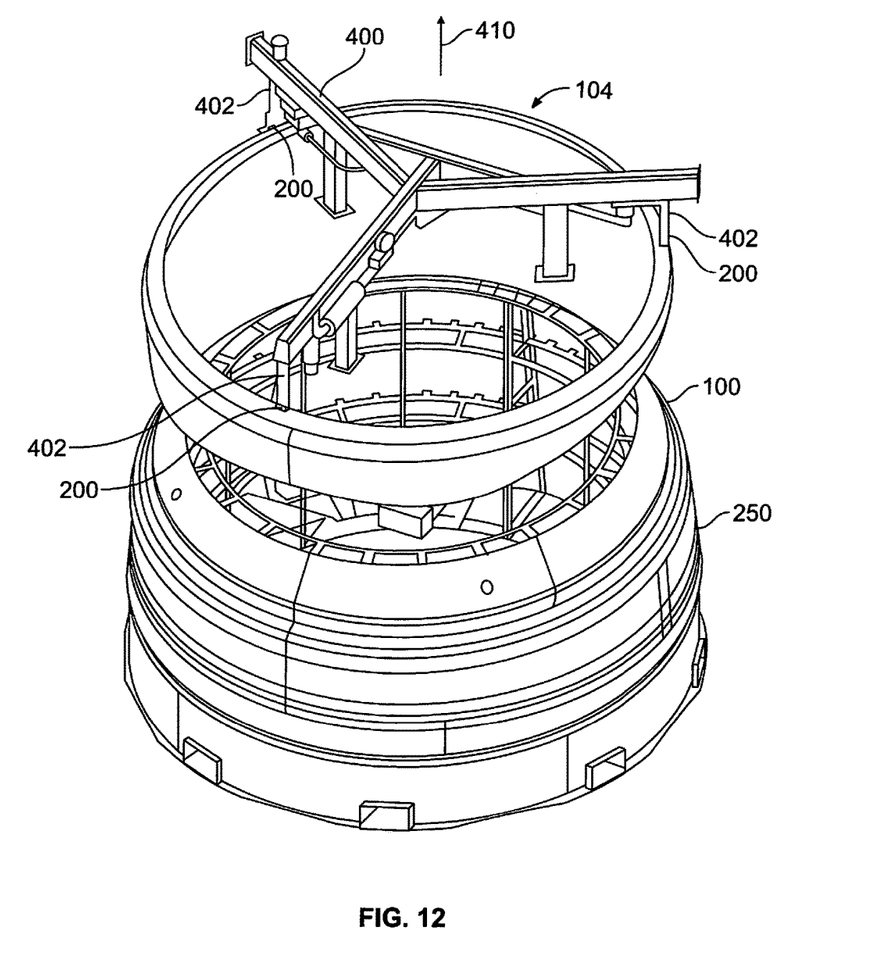
FIG. 12 illustrates a perspective top view of an extractor removing an upper ring from a mandrel assembly, according to an embodiment of the present disclosure.

FIG. 12 illustrates a perspective top view of an extractor 400 removing the upper ring 104 from the mandrel assembly 100, according to an embodiment of the present disclosure. After the curing process, the extractor 400 is aligned with the upper ring 104, such that prongs 402 engage the extraction protuberances 200, as described above. After the prongs 402 securely engage the extraction protuberances 200, the extractor 400 is lifted upwardly in the direction of arrow 410, thereby removing the upper ring 104 from the mandrel assembly 100.

Figure 13:
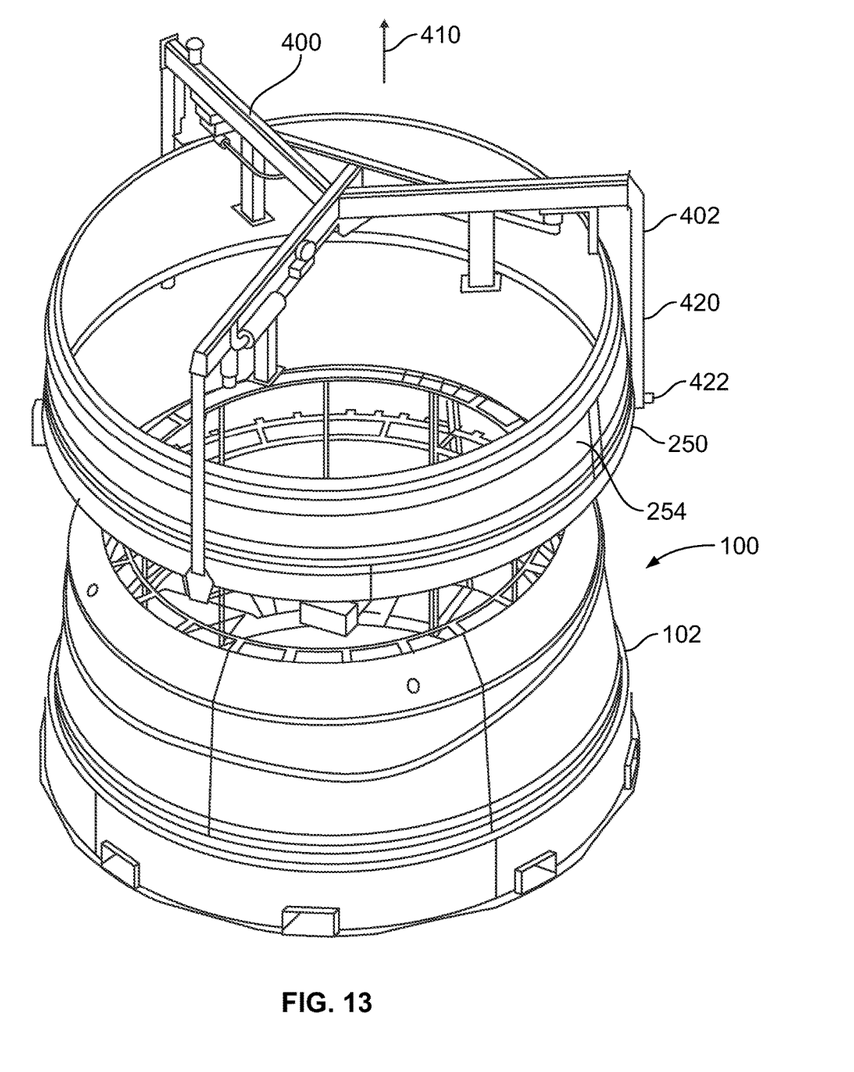
FIG. 13 illustrates a perspective top view of an extractor removing a component from a tower of a mandrel assembly, according to an embodiment of the present disclosure.

FIG. 13 illustrates a perspective top view of the extractor 400 removing the component 250 from the tower 102 of the mandrel assembly 100, according to an embodiment of the present disclosure. After the upper ring 104 is removed, such as shown and described with respect to FIG. 12, the fairing members 106 (shown in FIGS. 1 and 2, for example) may be removed from the tower 102. Extensions 420 may be secured to the prongs 402 of the extractor 400. The extensions 420 may include engaging ends 422, such as inwardly extending platforms, tabs, panels, beams, or the like, that are positioned underneath the lower flange 254 of the component 250. Once the lower flange 254 is supported by the engaging ends 422, the extractor 400 is lifted up in the direction of arrow 410 to remove the component 250 from the tower 102. As such, the component 250, such an acoustic inlet barrel, may be fully formed and removed from the mandrel assembly 100. After the forming operation, portions of the component 250 may be machined in order to provide a secure fit having acceptable tolerances within a housing of an aircraft engine, for example.

Figure 14:
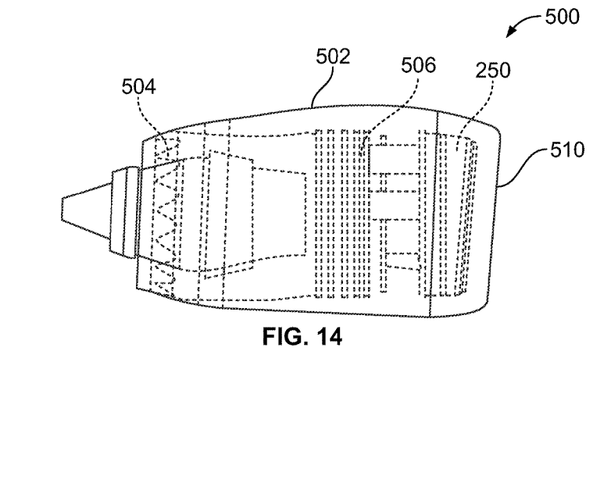
FIG. 14 illustrates an internal view of an aircraft engine, according to an embodiment of the present disclosure.

FIG. 14 illustrates an internal view of an aircraft engine 500, according to an embodiment of the present disclosure. The aircraft engine 500 includes a main housing 502 that retains a fan 504, an engine 506, and the component 250, such as an acoustic inlet barrel, positioned proximate to an air intake inlet 510 of the aircraft engine 500.

Figure 15:
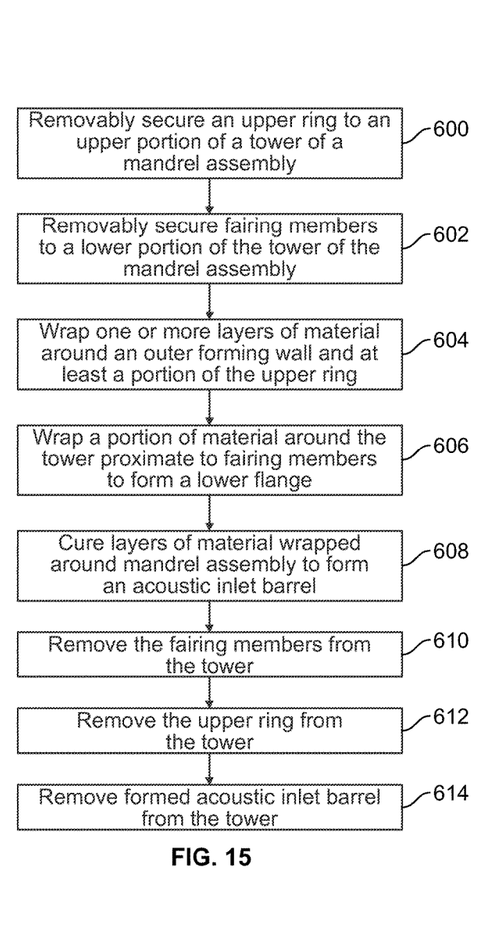
FIG. 15 illustrates a flow chart of a method of forming a component, according to an embodiment of the present disclosure.

FIG. 15 illustrates a flow chart of a method of forming a component, such as an acoustic inlet barrel, that is configured to be secured to and/or within an aircraft engine housing, according to an embodiment of the present disclosure. The method begins at 600, at which an upper ring is removably secured to an upper portion of a tower of a mandrel assembly.

At 602, fairing members are removably secured to a lower portion of the tower of the mandrel assembly. Alternatively, 602 may be omitted. The mandrel assembly may not include removable fairing members.

At 604, one or more layers of composite material are wrapped around an outer forming wall and at least a portion of the upper ring. At 606, a portion of the material is wrapped around the tower proximate to the fairing members to form a lower flange. If, however, the mandrel assembly does not include the fairing members, 606 is omitted.

At 608, the layers of composite material wrapped around the mandrel assembly are cured to form an acoustic inlet barrel that is secured around the mandrel assembly. At 610, the fairing members, if present, are removed from the tower, thereby exposing the formed lower flange of the acoustic inlet barrel. At 612, the upper ring is removed from the tower, thereby disconnecting the upper portion of the acoustic inlet barrel from the mandrel assembly. After the upper ring is removed, at 614, the formed acoustic barrel is removed from the tower. Once removed, portions of the formed acoustic barrel may be machined to provide a secure fit with the housing of the aircraft engine.

Referring to FIGS. 1-15, embodiments of the present disclosure provide a mandrel assembly that is configured to allow a component, such as an acoustic inlet barrel, to be formed as a single unitary piece with no connection seams, joints, or the like. The removable upper ring ensures that the formed component does not jig-lock on the mandrel assembly.

As described above, embodiments of the present disclosure provide a system and method of efficiently forming a component, such as an acoustic inlet barrel, from wrapped composite materials. Embodiments of the present disclosure provide a mandrel assembly that is configured to precisely, quickly, and repeatedly form an acoustic inlet barrel for an engine assembly of an aircraft, for example. Certain embodiments of the present disclosure provide a mandrel assembly that is configured to precisely, quickly, and repeatedly lay-up a complex, asymmetric (such as hourglass shaped) component, such as cylindrical sandwich member in which an acoustic material is sandwiched between outer layers of material.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A mandrel assembly configured to receive one or more layers of composite material to form a component, the mandrel assembly comprising:
    a tower including a base having an upper ledge that extends around the tower; and an outer forming wall extending upwardly from the upper ledge and connected to a beveled upper rim, wherein the outer forming wall surrounds a central passage, wherein the outer forming wall comprises an upper recess defined by a lower ledge that wraps around the outer forming wall, wherein the lower ledge has a variable depth around the outer forming wall; and
    an upper ring removably secured to the tower, wherein the upper ring includes an upper rim secured to a lower edge through a variable depth wall, wherein the upper ring is configured to be positioned within the upper recess that wraps around the outer forming wall, wherein the lower ledge of the outer forming wall has a shape that conforms to a shape of the lower edge of the upper ring, wherein the lower ledge supports the upper ring on the tower, wherein the upper ring is configured to be removed from the tower after the one or more layers of composite material are wrapped around the outer forming wall and at least a portion of the upper ring, and wherein the component formed of the one or more layers of composite material is configured to be removed from the tower after the upper ring is removed from the tower.

2. The mandrel assembly of claim 1, wherein the upper ring comprises at least one seal that that sealingly engages a portion of the outer forming wall.

3. The mandrel assembly of claim 1, wherein the upper ring extends outwardly away from the outer forming wall.

4. The mandrel assembly of claim 1, wherein the upper ring and the tower are shaped to form an hourglass cross-sectional shape in the component.

5. The mandrel assembly of claim 1, further comprising an internal liner jacket secured to an internal portion of the outer forming wall around the central passage, wherein a duct is defined between the internal liner jacket and the outer forming wall, wherein the duct is configured to receive curing gas.

6. The mandrel assembly of claim 1, wherein the upper ring comprises an upper end defining an upper opening and a lower end defining a lower opening, wherein the upper and lower openings are non-parallel.

7. The mandrel assembly of claim 1, wherein the upper ring comprises an upper end defining an upper opening and a lower end defining a lower opening, wherein one or both of the upper and lower openings is non-planar.

8. The mandrel assembly of claim 1, wherein the upper ring includes a thin portion that connects to a thick portion.

9. The mandrel assembly of claim 1, wherein at least a portion of an interior surface of the upper ring includes a plurality of structural supports defining a plurality of thermal features defining a lattice pattern.

10. The mandrel assembly of claim 1, further comprising one or more fairing members removably secured to a lower portion of the tower, wherein the one or more fairing members are configured to be supported on the upper ledge of the base, wherein the one or more fairing members are spaced apart from the upper ring when the upper ring and the one or more fairing members are secured to the tower.

11. The mandrel assembly of claim 10, wherein each of the one or more fairing members comprises at least one seal that sealingly engages a portion of the outer forming wall when the one or more fairing members are secured to the tower.

12. A system for forming a component through one or more wrapped layers of composite material, the system comprising:
    a mandrel assembly configured to receive the one or more wrapped layers of the composite material, the mandrel assembly comprising: (a) a tower including a base having an upper ledge that extends around the tower; and an outer forming wall extending upwardly from the upper ledge and connected to a beveled upper rim, wherein the outer forming wall surrounds a central passage, wherein the outer forming wall comprises an upper recess defined by a lower ledge that wraps around the outer forming wall, wherein the lower ledge has a variable depth around the outer forming wall, and (b) an upper ring removably secured to the tower, wherein the upper ring includes an upper rim secured to a lower edge through a variable depth wall, wherein the upper ring is configured to be positioned within the upper recess that wraps around the outer forming wall, wherein the lower ledge of the outer forming wall has a shape that conforms to a shape of the lower edge of the upper ring, wherein the lower ledge supports the upper ring on the tower, wherein the upper ring is configured to be removed from the tower after the one or more layers of composite material are wrapped around the outer forming wall and at least a portion of the upper ring, and wherein the component formed of the one or more layers of composite material is configured to be removed from the tower after the upper ring is removed from the tower;
    a curing device comprising a pedestal that supports the mandrel assembly, wherein the curing device is configured to cure the one or more wrapped layers of the composite material wrapped around the mandrel assembly to form the component; and
    an extractor configured to extract the upper ring from the tower after the curing device cures the one or more wrapped layers, and wherein the extractor is further configured to extract the component from the mandrel assembly after the upper ring has been extracted from the tower.

13. The system of claim 12, wherein the upper ring comprises at least one seal that that sealingly engages a portion of the outer forming wall.

14. The system of claim 12, wherein the upper ring extends outwardly away from the outer forming wall.

15. The system of claim 12, wherein the upper ring and the tower are shaped to form an hourglass cross-sectional shape in the component.

16. The system of claim 12, wherein the mandrel assembly further comprises an internal liner jacket secured to an internal portion of the outer forming wall around the central passage, wherein a duct is defined between the internal liner jacket and the outer forming wall, wherein the duct is configured to receive curing gas from the curing device.

17. The system of claim 12, wherein the upper ring includes a thin portion that connects to a thick portion.

18. The system of claim 12, wherein at least a portion of an interior surface of the upper ring includes a plurality of structural supports defining a plurality of thermal features defining a lattice pattern.

19. The system of claim 12, wherein the mandrel assembly further comprises one or more fairing members removably secured to a lower portion of the tower, wherein the one or more fairing members are configured to be supported on the upper ledge of the base, wherein the one or more fairing members are spaced apart from the upper ring when the upper ring and the one or more fairing members are secured to the tower, wherein each of the one or more fairing members comprises at least one seal that sealingly engages a portion of the outer forming wall when the one or more fairing members are secured to the tower.

20. A method for forming a component, the method comprising:

removably securing an upper ring to an upper portion of a tower including a base having an upper ledge that extends around the tower; and an outer forming wall extending upwardly from the upper ledge and connected to a beveled upper rim, wherein the outer forming wall surrounds a central passage, wherein the outer forming wall comprises an upper recess defined by a lower ledge that wraps around the outer forming wall, wherein the lower ledge has a variable depth around the outer forming wall, wherein the upper ring includes an upper rim secured to a lower edge through a variable depth wall, wherein the upper ring is configured to be positioned within the upper recess that wraps around the outer forming wall, wherein the lower ledge of the outer forming wall has a shape that confirms to a shape of the lower edge of the upper ring, wherein the lower ledge supports the upper ring on the tower;

wrapping one or more layers of material around the outer forming wall and at least a portion of the upper ring;

curing the one or more layers wrapped around the mandrel assembly to form the component;

removing the upper ring from the tower after the curing operation; and removing the component from the tower after the upper ring has been removed from the tower.

21. The method of claim 20, further comprising:

removably securing one or more fairing members to a lower portion of the tower before the wrapping operation, wherein the wrapping operation further comprises wrapping a portion of the one or more layers of material around the tower proximate to the one or more fairing members to form a lower flange; and removing the one or more fairing members from the tower after the curing operation.

* * * * *